United States Patent
Miyamoto et al.

(10) Patent No.: US 9,463,529 B2
(45) Date of Patent: Oct. 11, 2016

(54) LASER MACHINING APPARATUS THAT MONITORS MATERIAL THICKNESS AND TYPE BY REFLECTED LIGHT INTENSITY

(75) Inventors: Naoki Miyamoto, Chiyoda-ku (JP);
Kenji Kumamoto, Chiyoda-ku (JP);
Satoshi Nishida, Chiyoda-ku (JP);
Toshiki Koshimae, Chiyoda-ku (JP);
Hiroshi Kino, Chiyoda-ku (JP);
Hiroaki Kurokawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 636 days.

(21) Appl. No.: 13/877,762

(22) PCT Filed: May 11, 2012

(86) PCT No.: PCT/JP2012/062109
§ 371 (c)(1),
(2), (4) Date: Apr. 4, 2013

(87) PCT Pub. No.: WO2013/014994
PCT Pub. Date: Jan. 31, 2013

(65) Prior Publication Data
US 2013/0218321 A1    Aug. 22, 2013

(30) Foreign Application Priority Data
Jul. 28, 2011    (JP) .................. 2011-165568

(51) Int. Cl.
*B23K 26/06* (2014.01)
*B23K 26/38* (2014.01)
*B23K 26/03* (2006.01)
(52) U.S. Cl.
CPC .......... *B23K 26/0665* (2013.01); *B23K 26/03* (2013.01); *B23K 26/032* (2013.01); *B23K 26/38* (2013.01)

(58) Field of Classification Search
None
See application file for complete search history.

(56) References Cited

U.S. PATENT DOCUMENTS 5,463,202 A * 10/1995 Kurosawa ............ B23K 26/032
219/121.62
2003/0192865 A1    10/2003 Cole, III et al.
(Continued)

FOREIGN PATENT DOCUMENTS

EP    2265407 B1    5/2012
JP    6-312283 A    11/1994
(Continued)

OTHER PUBLICATIONS

Keen, WIPO Publication No. WO 2009/112815.*
(Continued)

*Primary Examiner* — Mohammad Ali
*Assistant Examiner* — Bernard G Lindsay
(74) *Attorney, Agent, or Firm* — Sughrue Mion, PLLC; Richard C. Turner (57) ABSTRACT

The laser machining apparatus includes a transmission fiber that transmits laser light emitted from a laser oscillator through the fiber, a machining head that emits the laser light, which is sent from the transmission fiber, vertically to a main surface of a machining object and sends reflected light, which is reflected coaxially with the laser light by the machining object, to the transmission fiber, a reflected light monitoring unit that detects a reflected light intensity of the reflected light sent from the transmission fiber, and a control device that controls the laser oscillator and the machining head, in which the control device includes a determining unit that, at a time when laser machining is started, determines whether the machining object corresponds to a machining condition or not in laser machining on the basis of the reflected light intensity.

9 Claims, 3 Drawing Sheets

(56) References Cited

U.S. PATENT DOCUMENTS

| | | | |
|---|---|---|---|
| 2006/0211158 A1* | 9/2006 | Arai | B23K 26/03 438/8 |
| 2010/0133243 A1 | 6/2010 | Nomaru et al. | |
| 2011/0147351 A1* | 6/2011 | Miyazaki | B23K 26/046 219/121.71 |

FOREIGN PATENT DOCUMENTS

| | | |
|---|---|---|
| JP | 7-128247 A | 5/1995 |
| JP | 8-10976 A | 1/1996 |
| JP | 2001-314992 A | 11/2001 |
| JP | 2002-239771 A | 8/2002 |
| JP | 2006-150373 A | 6/2006 |
| JP | 2009-142860 A | 7/2009 |
| JP | 2010-110796 A | 5/2010 |
| JP | 2010-125521 A | 6/2010 |
| JP | 2010-214452 A | 9/2010 |

OTHER PUBLICATIONS

Doring et al. 'In situ imaging of hole shape evolution in ultrashort pulse laser drilling' Optics Express, vol. 18, pp. 20395-20400 (2010), Optical Society of America.*

Communication dated May 7, 2015, issued by the European Patent Office in counterpart Application No. 12818022.1.

* cited by examiner

LASER MACHINING APPARATUS THAT MONITORS MATERIAL THICKNESS AND TYPE BY REFLECTED LIGHT INTENSITY

CROSS REFERENCE TO RELATED APPLICATIONS

This application is a National Stage of International Application No. PCT/JP2012/062109 filed May 11, 2012, claiming priority based on Japanese Patent Application No. 2011-165568 filed Jul. 28, 2011, the contents of all of which are incorporated herein by reference in their entirety.

FIELD

The present invention relates to a laser machining apparatus and a laser machining control device that reduce a machining defect.

BACKGROUND

Conventionally, when machining is performed by a laser machining apparatus, selection of a machining condition on the basis of an instruction from an NC (Numerical Control) apparatus and setting of a machining object (workpiece) are separately performed, therefore there is no correlation between them. Thus, even if the machining condition does not correspond to the machining object, machining is performed, which results in a machining defect.

As a method of determining whether a desired machining object is set, there is a method of arranging a reflected light detection sensor above a machining object and measuring the reflected light by this reflected light detection sensor. For example, when laser light is obliquely incident on the surface of the machining object, the reflected light intensity that can be detected depends largely on the angle due to the arrangement position of the reflected light detection sensor except for the case where the incidence angle of the laser light is always determined. In order to avoid this, a strip-shaped sensor needs to be arranged in a doughnut pattern to surround the optical axis of the incident laser light, therefore, the apparatus becomes complicated. Moreover, there is a method of arranging the reflected light detection sensor at a position spaced apart from the optical axis and causing laser light to be vertically incident on the surface of the machining object (for example, see Patent Literature 1).

CITATION LIST

Patent Literature

Patent Literature 1: Japanese Patent Application Laid-open No. 2010-214452

SUMMARY

Technical Problem

However, when the angle between the line connecting the incident light and the machining target point and the line connecting the machining target point and the reflected light detection sensor is 0°, the reflected light intensity becomes maximum and the reflected light intensity decreases as the angle becomes larger. Therefore, with the above conventional technology in which the reflected light detection sensor is arranged at a position spaced apart from the optical axis, there is a problem in that it is difficult to obtain a high measurement accuracy for the reflected light intensity.

The present invention is achieved in view of the above and has an object to obtain a laser machining apparatus and a laser machining control device that accurately determine whether appropriate laser machining can be performed on the basis of the reflected light intensity that is detected with high accuracy.

Solution to Problem

An aspect of the present invention includes: a transmission fiber that transmits laser light emitted from a laser oscillator through the fiber; a machining head that emits the laser light, which is sent from the transmission fiber, vertically to a main surface of a machining object and sends reflected light, which is reflected coaxially with the laser light by the machining object, to the transmission fiber; a reflected-light-intensity detecting unit that detects a reflected light intensity of the reflected light sent from the transmission fiber; and a control device that controls the laser oscillator and the machining head, wherein the control device includes a determining unit that, at a time when laser machining is started, determines whether the machining object corresponds to a machining condition in laser machining or not on a basis of the reflected light intensity.

Advantageous Effects of Invention

According to the present invention, at a time when laser machining is started, it is determined whether a machining object corresponds to a machining condition in laser machining on the basis of the intensity of reflected light that is reflected coaxially with laser light by the machining object, therefore, an effect can be obtained where it is possible to accurately determine whether appropriate laser machining can be performed on the basis of the reflected light intensity that is detected with high accuracy.

DESCRIPTION OF EMBODIMENTS

A laser machining apparatus and a laser machining control device according to an embodiment of the present invention will be explained below in detail with reference to the drawings. This invention is not limited to this embodiment.

First Embodiment

Figure 1:
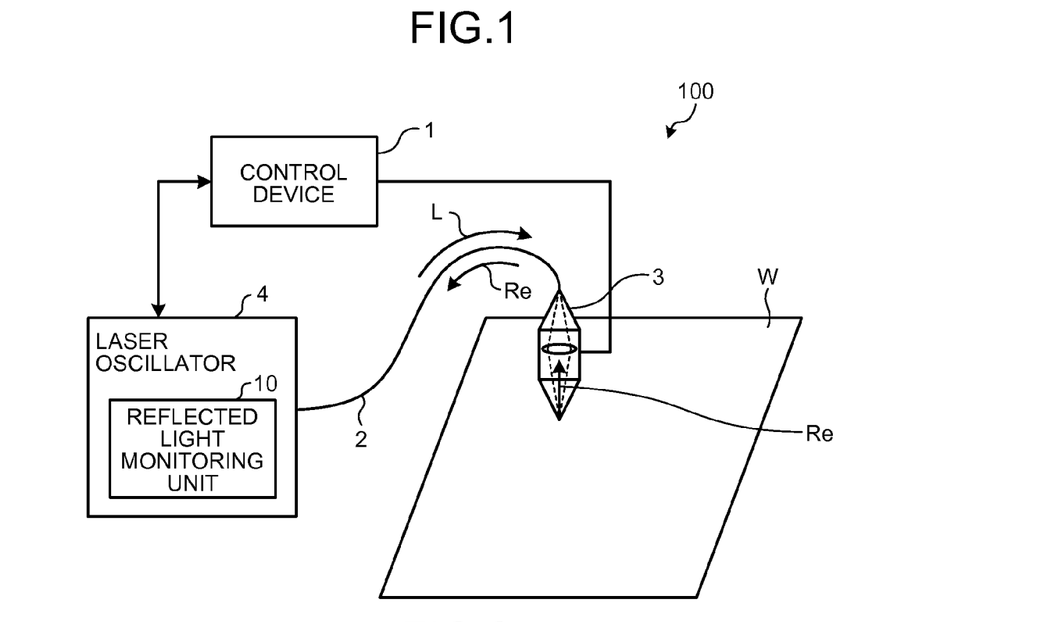
FIG. 1 is a diagram illustrating a configuration of a laser machining apparatus according to a first embodiment.

FIG. 1 is a diagram illustrating a configuration of a laser machining apparatus according to the first embodiment. A laser machining apparatus 100 is, for example, an apparatus that cuts a machining object W (such as plate-like member)

by laser light and includes a laser oscillator 4, a transmission fiber 2, a machining head 3, and a control device 1.

The laser oscillator 4 oscillates laser light L (for example, solid-state laser) capable of being transmitted through a fiber and sends it to the transmission fiber 2. The transmission fiber 2 is connected to the laser oscillator 4 at one end and is connected to the machining head 3 at the other end. The transmission fiber 2 transmits the laser light L from the laser oscillator 4 to the machining head 3, and transmits reflected light Re reflected by the machining object W to the laser oscillator 4 side.

The machining head 3 emits the laser light L transmitted through the transmission fiber 2 to the machining object W. The machining head 3 includes a condenser lens that condenses the laser light L and causes the condenser lens to condense the laser light L on the machining object W. Consequently, the machining head 3 emits the laser light L sent from the transmission fiber 2 vertically to the main surface of the machining object W.

Moreover, the machining head 3 sends the reflected light Re, which is reflected coaxially with the laser light L by the machining object W, to the transmission fiber 2. In order to accurately measure the reflected light Re, the machining head 3 is arranged at a position (coaxially with the optical path) vertical to the machining object W.

The laser oscillator 4 includes a reflected light monitoring unit (reflected-light-intensity detecting unit) 10 and the reflected light monitoring unit 10 detects the reflected light intensity of the reflected light Re. The control device 1 controls the laser oscillator 4 and the machining drive unit (such as the machining head 3 and a platform to be described later) of the laser machining apparatus 100. The control device 1 in the present embodiment determines whether the material and the plate thickness of the machining object W are those of a desired machining object (machining object corresponding to the machining condition (for example, laser output, frequency, duty, type of machining gas, pressure of machining gas, focal position, and nozzle gap)) on the basis of the reflected light intensity. In other words, the control device 1 determines whether the machining condition is correct on the basis of the reflected light intensity.

The machining object W is, for example, a member predominantly made of metal. The machining object W is laser-machined in a state of being fixed to the platform (not shown) that can move in a plane vertical to the irradiation direction of the laser light L. When the machining object W is machined, the machining condition corresponding to the machining object W is selected. When the control device 1 determines that the machining object W corresponding to the machining condition is not placed on the platform, the machining condition is corrected or the machining object W is replaced.

In the laser machining apparatus 100, the laser light L oscillated from the laser oscillator 4 passes the transmission fiber 2 and the machining head 3 and is emitted to the machining object W. Part of the reflected light Re generated at that time passes the machining head 3 and the transmission fiber 2 and is returned to the reflected light monitoring unit 10, whereby the reflected light intensity is measured. The reflected light Re is condensed by the machining head 3 and is returned to the reflected light monitoring unit 10, therefore, a wide range of the reflected light Re can be returned to the reflected light monitoring unit 10. As a result, the reflected light monitoring unit 10 can obtain a large amount of signal of the reflected light Re.

Figure 2:
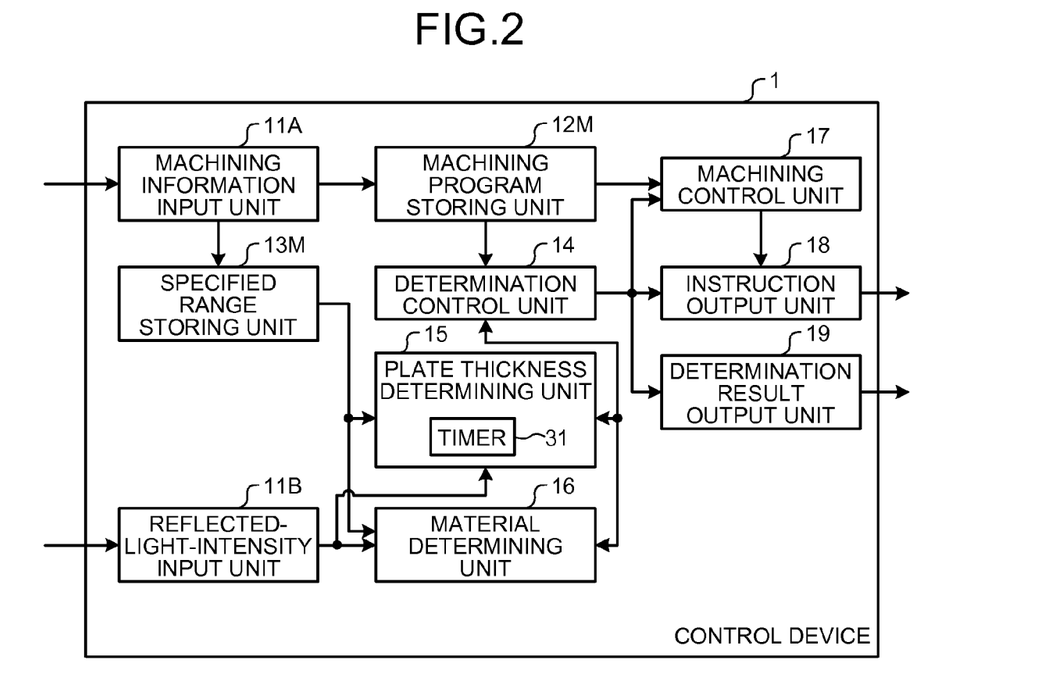
FIG. 2 is a block diagram illustrating a configuration of a control device included in the laser machining apparatus according to the first embodiment.

Next, the configuration of the control device 1 will be explained. FIG. 2 is a block diagram illustrating a configuration of the control device included in the laser machining apparatus according to the first embodiment. The control device 1 (laser machining control device) included in the laser machining apparatus 100 includes a machining information input unit 11A, a reflected-light-intensity input unit 11B, a machining program storing unit 12M, a specified range storing unit 13M, a determination control unit 14, a plate thickness determining unit 15, a material determining unit 16, a machining control unit 17, an instruction output unit 18, and a determination result output unit 19.

The machining information input unit 11A inputs information used when the machining object W is machined. Specifically, the machining information input unit 11A inputs a machining program thereinto and sends it to the machining program storing unit 12M. Moreover, the machining information input unit 11A inputs a specified range (hereinafter, reflected-light-intensity specified range) of the reflected light intensity used for determining the material of the machining object W and a specified range (hereinafter, piercing-time specified range) of the piercing time used for determining the plate thickness of the machining object W and sends them to the specified range storing unit 13M. The reflected-light-intensity specified range is an allowable range of the reflected light intensity and the piercing-time specified range is an allowable range of the piercing time. For example, in the case of mild steel, the piercing time is 7 seconds where the plate thickness is 12 mm, 10 seconds where the plate thickness is 16 mm, and 15 seconds where the plate thickness is 19 mm.

The reflected-light-intensity input unit 11B inputs thereinto the reflected light intensity measured by the reflected light monitoring unit 10 of the laser oscillator 4 and sends it to the material determining unit 16 and the plate thickness determining unit 15. The machining program storing unit 12M is, for example, a memory that stores a machining program. The machining program in this embodiment is a program used for laser-machining the machining object W and includes the machining position, the machining sequence, the machining condition, and the like. The specified range storing unit 13M is, for example, a memory that stores the reflected-light-intensity specified range and the piercing-time specified range.

Figure 5:
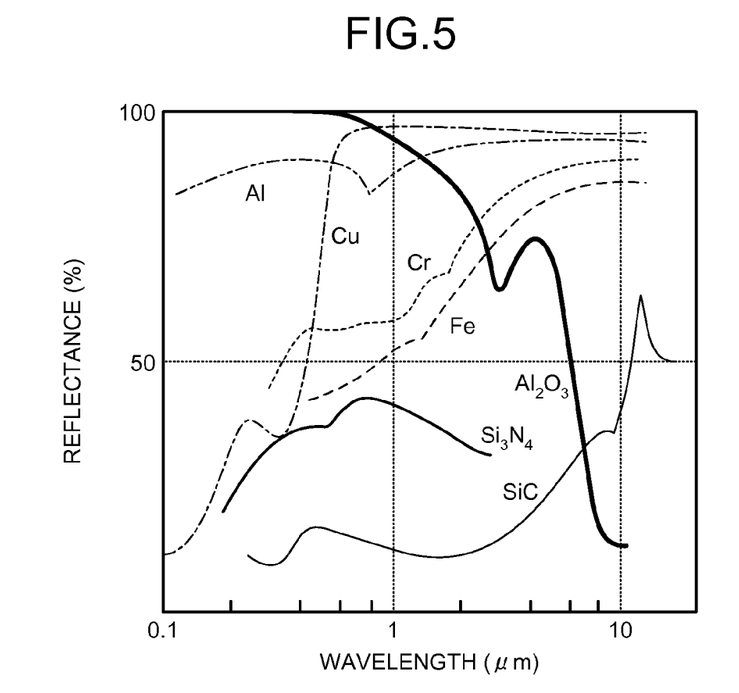
FIG. 5 is a diagram illustrating the reflectance for each material.

The reflectance on the machining object W with respect to the laser light L is determined based on the physical property (material) of the machining object W. For example, copper has a high reflectance and iron has a low reflectance (FIG. 5). Therefore, the specified range storing unit 13M stores the reflected-light-intensity specified range and the piercing-time specified range for each machining condition (for each machining object W). In the specified range storing unit 13M, information in which the machining condition is associated with the reflected-light-intensity specified range and information in which the machining condition is associated with the piercing-time specified range are stored.

When the determination control unit 14 determines the plate thickness or the material of the machining object W, the determination control unit 14 generates instruction information to be sent to the laser oscillator 4 and the machining head 3. The determination control unit 14 extracts a region (non-product region) that is not be used for the product machining from the region on the machining object W. The determination control unit 14 reads the machining program from the machining program storing unit 12M and extracts the non-product region on the basis of the machining position set in the machining program. Moreover, the determination control unit 14 reads the machining condition from the machining program. The machining condition is a machining condition used when the product machining is performed on the machining object W. The machining condition is, for example, a laser output value of the laser light L used when machining is started (piercing) and during machining (cutting), the movement speed of the machining head 3, and the like. In the following, explanation is given of a case where the machining condition used when machining is started is the machining condition (piercing condition) related to the piercing.

The determination control unit 14 causes the laser oscillator 4 and the machining head 3 to perform a test (test machining) of laser machining at any position (test position) in the non-product region under the piercing condition that is used when machining is started. The determination control unit 14 sends the instruction information for the test machining to be sent to the laser oscillator 4 and the machining head 3 to the instruction output unit 18.

Moreover, the determination control unit 14 issues a machining start instruction (machining start instruction to the product region) to the machining control unit 17 and issues a determination result output instruction to the determination result output unit 19 on the basis of the determination results from the plate thickness determining unit 15 and the material determining unit 16. When normal determination results (determination result indicating that the machining object W corresponding to the machining condition is placed on the platform) are sent from the plate thickness determining unit 15 and the material determining unit 16, respectively, the determination control unit 14 sends the machining start instruction to the machining control unit 17.

Moreover, when the determination control unit 14 receives normal determination results from the plate thickness determining unit 15 and the material determining unit 16, the determination control unit 14 instructs the determination result output unit 19 to output a normal determination result. On the contrary, when the determination control unit 14 receives an abnormal determination result (determination result indicating that the machining object W corresponding to the machining condition is not placed on the platform) from the plate thickness determining unit 15 or the material determining unit 16, the determination control unit 14 instructs the determination result output unit 19 to output an abnormal determination result.

The plate thickness determining unit 15 reads the piercing-time specified range corresponding to the machining condition from the specified range storing unit 13M on the basis of the machining condition extracted by the determination control unit 14. The plate thickness determining unit 15 determines the plate thickness of the machining object W for each machining condition on the basis of the change in the reflected light intensity from the time when the test machining is started.

The plate thickness determining unit 15 includes a timer 31 that measures the time from when the test machining is started to when the reflected light intensity decreases to a predetermined value (threshold value) and compares the time measured by the timer 31 with the piercing-time specified range read from the specified range storing unit 13M. During the piercing, the reflected light intensity is a predetermined value, however, the reflected light intensity decreases dramatically after the machining object W is pierced by the piercing. Therefore, as a threshold of the reflected light intensity, a value (hereinafter, piercing completion threshold) which is slightly larger than the reflected light intensity detected when the piercing is completed is set. The value is stored in advance in the specified range storing unit 13M or the like. The piercing completion threshold is set for each machining condition.

When the time measured by the timer 31 is within the piercing-time specified range, the plate thickness determining unit 15 determines that the plate thickness is correct (the machining object W having a plate thickness corresponding to the machining condition is placed on the platform), and sends a normal determination result relating to the plate thickness to the determination control unit 14.

When the time measured by the timer 31 is not within the piercing-time specified range, the plate thickness determining unit 15 determines that the plate thickness is not correct (the machining object W having a plate thickness difference from the plate thickness corresponding to the machining condition is placed on the platform), and sends an abnormal determination result relating to the plate thickness to the determination control unit 14.

The material determining unit 16 reads the reflected-light-intensity specified range corresponding to the machining condition from the specified range storing unit 13M on the basis of the machining condition extracted by the determination control unit 14. The material determining unit 16 determines the material of the machining object W for each machining condition on the basis of the reflected light intensity detected immediately after the piercing is started.

The material determining unit 16 compares the reflected light intensity sent from the reflected light monitoring unit 10 with the reflected-light-intensity specified range read from the specified range storing unit 13M. When the reflected light intensity sent from the reflected light monitoring unit 10 is within the reflected-light-intensity specified range, the material determining unit 16 determines that the material is correct (the machining object W made of a material corresponding to the machining condition is placed on the platform) and sends a normal determination result relating to the material to the determination control unit 14.

When the reflected light intensity sent from the reflected light monitoring unit 10 is not within the reflected-light-intensity specified range, the material determining unit 16 determines that the material is not correct (the machining object W made of a material different from the material corresponding to the machining condition is placed on the platform) and sends an abnormal determination result relating to the material to the determination control unit 14.

When the machining start instruction is sent from the determination control unit 14, the machining control unit 17 reads the machining program in the machining program storing unit 12M and sends the machining instruction to the instruction output unit 18. Consequently, laser machining to the product region of the machining object W is started.

The instruction output unit 18 sends the instruction information (control instruction) sent from the machining control unit 17 and the determination control unit 14 to the laser oscillator 4, the machining head 3, and the like. The determination result output unit 19 causes a display device (for example, liquid crystal display monitor) to display a normal determination result or an abnormal determination result sent from the determination control unit 14.

Figure 3:
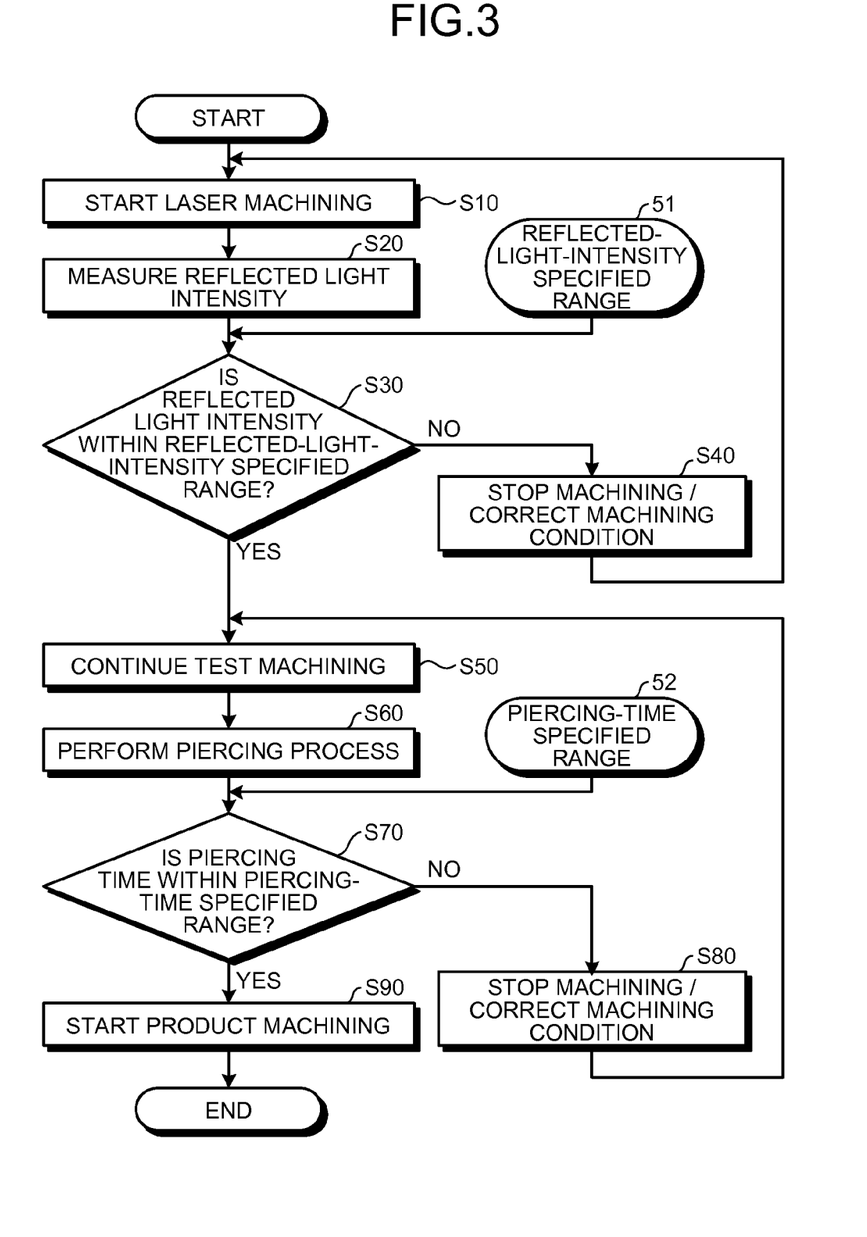
FIG. 3 is a flowchart illustrating a machining process procedure of the laser machining apparatus.

Next, the procedure of the machining process by the laser machining apparatus 100 will be explained. FIG. 3 is a flowchart illustrating a machining process procedure of the laser machining apparatus. The laser machining apparatus 100, when the test machining is performed on the machining object W and it is determined that the machining object W that has a plate thickness and is made of a material corresponding to the machining condition is placed on the platform, performs the product machining on the machining object W.

Therefore, the laser machining apparatus 100 starts laser machining by first performing the test machining on the machining object W (Step S10). Specifically, the determination control unit 14 reads the machining program from the machining program storing unit 12M and extracts the non-product region on the basis of the machining position set in the machining program. Furthermore, the determination control unit 14 reads the machining condition from the machining program and reads the piercing condition from the machining condition. Then, the determination control unit 14 causes the laser oscillator 4 and the machining head 3 to perform the test machining at any position in the non-product region under the piercing condition. Therefore, the determination control unit 14 sends the instruction information for the test machining to be sent to the laser oscillator 4 and the machining head 3 to the instruction output unit 18. Consequently, the instruction information for the test machining is sent to the laser oscillator 4 and the machining head 3 from the instruction output unit 18.

The laser light L corresponding to the piercing condition for the test machining is emitted from the laser oscillator 4. This laser light L is emitted to the machining object W via the transmission fiber 2 and the machining head 3. Then, part of the reflected light Re reflected by the machining object W is sent to the reflected light monitoring unit 10 via the machining head 3 and the transmission fiber 2. Consequently, the reflected light intensity is measured by the reflected light monitoring unit 10 (Step S20). The reflected light monitoring unit 10 sends the measured reflected light intensity to the control device 1. The reflected-light-intensity input unit 11B of the control device 1 sends the reflected light intensity to the material determining unit 16 and the plate thickness determining unit 15.

The determination control unit 14 reads the machining condition from the machining program and sends it to the material determining unit 16 and the plate thickness determining unit 15. The material determining unit 16 reads a reflected-light-intensity specified range 51 corresponding to the machining condition from the specified range storing unit 13M.

The material determining unit 16 determines whether the reflected light intensity is within the reflected-light-intensity specified range 51 on the basis of the reflected light intensity immediately after the piercing is started (Step S30). When the reflected light intensity sent from the reflected light monitoring unit 10 is not within the reflected-light-intensity specified range 51 (No in Step S30), the material determining unit 16 determines that the machining object W made of a material, which does not correspond to the machining condition, is placed on the platform. Then, the material determining unit 16 sends an abnormal determination result relating to the material to the determination control unit 14.

When the determination control unit 14 receives the abnormal determination result from the material determining unit 16, machining is stopped or the machining condition is corrected (Step S40). At that time, the determination control unit 14 outputs the abnormal determination result relating to the material to the determination result output unit 19. Consequently, the determination result output unit 19 causes a display device or the like to display the abnormal determination result relating to the material.

In the case of stopping machining, the determination control unit 14 outputs a machining stop instruction to the instruction output unit 18. Consequently, the machining stop instruction is sent from the instruction output unit 18 to the laser oscillator 4 and the machining head 3, and the operation of the laser oscillator 4 and the machining head 3 is stopped. Thereafter, a user of the laser machining apparatus 100 replaces the machining object W with a suitable machining object W corresponding to the machining condition.

Moreover, in the case of correcting the machining condition, a user of the laser machining apparatus 100 corrects the machining condition. Specifically, the machining condition is corrected to the machining condition (such as the laser output value of the laser light L and the movement speed of the machining head 3) corresponding to the material of the machining object W placed on the platform. The machining condition after correction is input to the machining information input unit 11A and is sent to the machining program storing unit 12M. Then, the new machining condition after correction is set in the machining program.

The surface of the machining object W may be oxidized or the surface of the machining object W may be rough. In such cases, the reflected light intensity is determined to be outside the reflected-light-intensity specified range 51 in some cases, therefore, the machining condition may be corrected to the machining condition in accordance with the surface condition of the machining object W.

Thereafter, the processes in Steps S10 to S40 are repeated until the reflected light intensity sent from the reflected light monitoring unit 10 falls within the reflected-light-intensity specified range 51. When the reflected light intensity sent from the reflected light monitoring unit 10 falls within the reflected-light-intensity specified range 51 (Yes in Step S30), the material determining unit 16 determines that the machining object W made of a material corresponding to the machining condition is placed on the platform. Then, the material determining unit 16 sends a normal determination result relating to the material to the determination control unit 14.

Then, in the laser machining apparatus 100, the test machining (piercing) is continued (Step S50). Consequently, the laser light L corresponding to the piercing condition for the test machining continues to be emitted from the laser oscillator 4 and the piercing process is performed on the machining object W (Step S60). In the laser machining apparatus 100, emission of the laser light L and measurement of the reflected light intensity are continued until the piercing process to the machining object W is completed.

The plate thickness determining unit 15 reads a piercing-time specified range 52 corresponding to the machining condition from the specified range storing unit 13M on the basis of the machining condition extracted by the determination control unit 14. The timer 31 of the plate thickness determining unit 15 measures the time from when the test machining is started to when the reflected light intensity decreases to the piercing completion threshold. The plate thickness determining unit 15 compares the time measured by the timer 31 with the piercing-time specified range 52 read from the specified range storing unit 13M (Step S70).

When the time measured by the timer 31 is not within the piercing-time specified range 52 (No in Step S70), the plate thickness determining unit 15 determines that the machining object W having a plate thickness different from the plate thickness corresponding to the machining condition is placed on the platform. Then, the plate thickness determining unit 15 sends an abnormal determination result relating to the plate thickness to the determination control unit 14.

When the determination control unit 14 receives the abnormal determination result from the plate thickness determining unit 15, machining is stopped or the machining condition is corrected (Step S80). At that time, the determination control unit 14 outputs the abnormal determination result related to the plate thickness to the determination result output unit 19. Consequently, the determination result output unit 19 causes a display device or the like to display the abnormal determination result relating to the plate thickness.

In the case of stopping machining, the machining object W is replaced by a suitable machining object W corresponding to the machining condition by the process similar to the process explained in Step S40. Moreover, in the case of correcting the machining condition, a new machining condition is set in the machining program by the process similar to the process explained in Step S40.

Thereafter, the processes in Steps S50 to S80 are repeated until the time measured by the timer 31 falls within the piercing-time specified range 52. At that time, the determination control unit 14 selects an unused position in the test machining in the non-product region as the next test position. Then, the determination control unit 14 causes the laser oscillator 4 and the machining head 3 to perform the test machining at the selected test position under the piercing condition. In other words, the test machining is performed after the position for the test machining is changed.

When the time measured by the timer 31 falls within the piercing-time specified range 52 (Yes in Step S70), the plate thickness determining unit 15 determines that the machining object W having a plate thickness corresponding to the machining condition is placed on the platform. Then, the plate thickness determining unit 15 sends a normal determination result relating to the plate thickness to the determination control unit 14.

Thereafter, in the laser machining apparatus 100, the product machining is performed on the machining object W by the machining control unit 17 (Step S90). In other words, when the normal determination result (machining start instruction) is sent from the determination control unit 14, the machining control unit 17 reads the machining program in the machining program storing unit 12M and sends the machining instruction to the instruction output unit 18.

Figure 4:
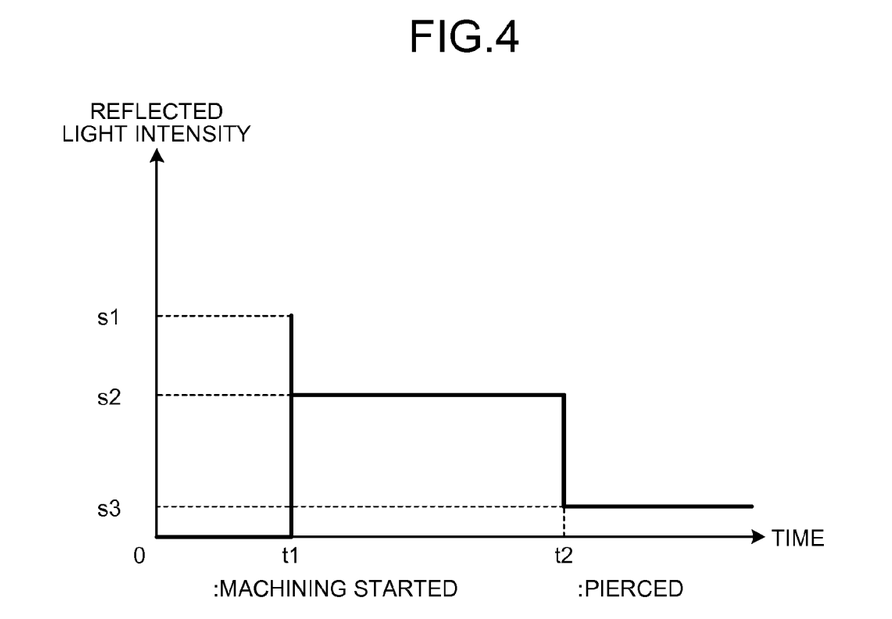
FIG. 4 is an example of a time chart illustrating the change in the reflected light intensity.

FIG. 4 is an example of a time chart illustrating the change in the reflected light intensity. When the test machining is started (time t1), the laser light L is emitted to the machining object W. At that time, because the laser light L is emitted to the surface of the machining object W, the reflected light intensity increases and temporarily reaches s1. Thereafter, as the piercing proceeds and, for example, after 1 millisecond, the reflected light intensity decreases to s2.

The material determining unit 16 compares s1 of the reflected light intensity with the reflected-light-intensity specified range 51 and checks the consistency of the machining condition (material). Subsequently, when the piercing is completed at time t2, the laser light L, which is being emitted, passes through the through hole in the machining object W. Therefore, little laser light L is reflected from the machining object W, and as a result, the reflected light intensity decreases to s3 near zero. The piercing completion threshold is slightly larger than s3 in this embodiment.

The timer 31 of the plate thickness determining unit 15 measures the time (time from time t1 to time t2) from when the test machining is started to when the reflected light intensity decreases to the piercing completion threshold. The plate thickness determining unit 15 compares the time (for example, 0.1 s to a few seconds) from time t1 to time t2 with the piercing-time specified range 52 and checks the consistency of the machining condition (plate thickness).

In the present embodiment, explanation is given of a case where the test machining is performed under the machining condition used when machining of the machining object W is started, however, a machining condition for the test machining may be prepared in advance. Moreover, in the present embodiment, explanation is given of a case where material determination and plate thickness determination are performed on the basis of the reflected light intensity when the test machining is performed in the non-product region, however, material determination and plate thickness determination may be performed on the basis of the reflected light intensity when the product machining is actually started. In this case, the laser light L is emitted to the first machining position set in the machining program and material determination and plate thickness determination are performed on the basis of the reflected light intensity and the piercing time at the first machining position. Then, when a normal determination result is received, control of the laser oscillator 4 and the machining head 3 is continued by using the machining program. On the contrary, when an abnormal determination result is received, machining is stopped or the machining condition is corrected.

Moreover, the laser machining apparatus 100 may perform a boring operation on the machining object W without being limited to cutting of the machining object W. Moreover, the machining object W is not limited to a plate-like member composed of a single layer and may be a plate-like member (for example, printed-circuit board) composed of multiple layers. In this case, the material and the plate thickness may be determined for each layer.

Moreover, in the present embodiment, it is determined on the basis of the machining condition whether the correct machining object W is set, however, the machining condition may be automatically selected on the basis of the reflected light intensity or the piercing time when the piercing is performed. In this case, the piercing is performed under the machining condition for the test without setting the machining condition for the product machining and thereafter, the machining condition for the product machining is set on the basis of the reflected light intensity or the piercing time detected when the piercing is performed.

Moreover, if the material is the same within the machining range, it is possible to detect a minute change of the reflected light intensity when the cutting is performed from the reflected light intensity when the piercing is performed, and select the machining condition in accordance with the detected change. In this case, a plurality of machining conditions in accordance with the change in the reflected light intensity is prepared. Then, the machining condition is automatically changed on the basis of the change in the reflected light intensity.

Moreover, a control program used when the test machining is performed may be included in the machining program. In this case, the test machining and the product machining are performed by using the machining program. Moreover, in the present embodiment, explanation is given of a case where the laser light L and the reflected light Re are transmitted by one transmission fiber 2, however, the transmission fiber 2 for the laser light L and the transmission fiber 2 for the reflected light Re may be provided in the laser machining apparatus 100.

In this manner, according to the present embodiment, because it is determined whether the machining object W is the machining object W corresponding to the machining condition on the basis of the reflected light intensity, it is possible to correctly determine whether the correspondence relationship between the machining object W and the machining condition is appropriate. Therefore, laser machining to an incorrect machining object W and laser machining under an unsuitable machining condition can be prevented. In other words, a mismatch between the machining condition and the machining object W is detected on the basis of the reflected light intensity, therefore, it is possible to reduce the occurrence of a machining defect (incorrect machining).

Moreover, when the piercing is performed, the reflected light intensity is coaxially detected by using the machining head 3 arranged coaxially with the laser light L, therefore, the reflected light intensity can be accurately detected as the plate thickness of the machining object W increases. Moreover, because the plate thickness of the machining object W is determined on the basis of the piercing time, it is possible to correctly determine whether the machining object W is a desired machining object W corresponding to the machining condition. Moreover, because the material of the machining object W is determined on the basis of the reflected light intensity when the piercing is started, it is possible to correctly determine whether the machining object W is a desired machining object W that corresponds to the machining condition.

Moreover, the product machining is performed on the machining object W by using the machining program after the piercing is performed at the test position and it is determined that the machining object W is a desired machining object W that corresponds to the machining condition, therefore, it is possible to reduce the occurrence of a machining defect.

Moreover, the product machining by the machining program is continued after the piercing is performed at the first machining position set in the machining program and it is determined that the machining object W is a desired machining object W that corresponds to the machining condition, therefore, determination of the machining object W can be performed in a short time without performing the test machining.

INDUSTRIAL APPLICABILITY

As described above, the laser machining apparatus and the laser machining control device according to the present invention are suitable for reducing a machining defect.

REFERENCE SIGNS LIST 1 control device
2 transmission fiber
3 machining head
4 laser oscillator
10 reflected light monitoring unit
11A machining information input unit
11B reflected-light-intensity input unit
12M machining program storing unit
13M specified range storing unit
14 determination control unit
15 plate thickness determining unit
16 material determining unit
17 machining control unit
100 laser machining apparatus
L laser light
Re reflected light
W machining object

The invention claimed is:

1. A laser machining apparatus comprising:
a transmission fiber that transmits laser light emitted from a laser oscillator through the fiber;
a machining head that emits the laser light, which is sent from the transmission fiber, vertically to a main surface of a machining object and sends reflected light, which is reflected coaxially with the laser light by the machining object, to the transmission fiber;
a reflected-light-intensity detecting unit that detects a reflected light intensity of the reflected light sent from the transmission fiber; and
a control device that controls the laser oscillator and the machining head, wherein
the control device includes a determining unit that, at a time when laser machining is started, determines whether the machining object corresponds to a machining condition in laser machining or not on a basis of the reflected light intensity, wherein the machining condition is read from a machining program that includes a machining position in a product region in the machining object and the machining condition,
the determining unit compares a measurement time measured from when the piercing is started to when the reflected light intensity decreases to a predetermined value with a first specified range relating to a measurement time stored in advance, and determines whether the machining object has a thickness corresponding to the machining condition on a basis of a comparison result, and
in response to determining that the machining object has a thickness different from a thickness corresponding to the machining condition, the determining unit causes a determination result output unit to output an abnormal determination result relating to thickness.

2. The laser machining apparatus according to claim 1, wherein
the reflected-light-intensity detecting unit detects the reflected light intensity when piercing that is a boring operation to the machining object is performed, and
the determining unit determines whether the machining object corresponds to the machining condition on a basis of a reflected light intensity detected when the piercing is performed.

3. The laser machining apparatus according to claim 1, wherein the determining unit determines whether the machining object corresponds to a machining condition in laser machining in a product region of the machining object or not on a basis of the reflected light intensity.

4. The laser machining apparatus according to claim 3, wherein the determining unit further extracts a non-product region from the machining object, compares a measurement time measured from when the piercing is started in the non-product region to when the reflected light intensity decreases to the predetermined value, and determines whether the machining object has a thickness corresponding to the machining condition in the product region of the machining object.

5. A laser machining apparatus comprising:
a transmission fiber that transmits laser light emitted from a laser oscillator through the fiber;
a machining head that emits the laser light, which is sent from the transmission fiber, vertically to a main surface of a machining object and sends reflected light, which is reflected coaxially with the laser light by the machining object, to the transmission fiber;
a reflected-light-intensity detecting unit that detects a reflected light intensity of the reflected light sent from the transmission fiber; and
a control device that controls the laser oscillator and the machining head, wherein the control device includes a determining unit that, at a time when laser machining is started, determines whether the machining object corresponds to a machining condition in laser machining or not on a basis of the reflected light intensity, wherein the machining condition is read from a machining program that includes a machining position in a product region in the machining object and the machining condition, the determining unit compares a reflected light intensity detected at a time when the piercing is started with a second specified range relating to a reflected light intensity stored in advance, and determines whether the machining object is made of a material corresponding to the machining condition or not on a basis of a comparison result, and in response to determining that the machining object is made of a material different from a material corresponding to the machining condition, the determining unit causes a determination result output unit to output an abnormal determination result relating to material.

6. The laser machining apparatus according to claim 5, wherein the reflected-light-intensity detecting unit detects the reflected light intensity when piercing that is a boring operation to the machining object is performed, and the determining unit determines whether the machining object corresponds to the machining condition on a basis of a reflected light intensity detected when the piercing is performed.

7. A laser machining control device comprising:

an input unit to which reflected light intensity is input when the reflected light intensity of reflected light sent via a machining head and a transmission fiber is detected in a case where the machining head emits laser light, which is emitted from a laser oscillator and is transmitted through the transmission fiber, vertically to a main surface of the machining object and the reflected light is reflected coaxially with the laser light by the machining object;

a first storing unit that stores a specified range relating to the reflected light intensity;

a second storing unit that stores a machining program that includes a machining position in a product region in the machining object and a machining condition used when laser machining is started;

a first control unit that controls the laser oscillator and the machining head by using the machining program; and a determining unit that determines whether the machining object corresponds to the machining condition or not on a basis of a comparison result between a reflected light intensity that is input to the input unit when the machining object is irradiated with laser light under the machining condition and a specified range stored in the storing unit, and the laser machining control device further comprises a second control unit that controls the laser oscillator and the machining head such that test emission of the laser light is performed to a non-product region other than the product region in the machining object, wherein the second control unit sets a test position, to which test emission of the laser light is performed, to any position in the non-product region on a basis of the machining position which is read from the machining program and controls the laser oscillator and the machining head such that the test emission of the laser light is performed to the test position under the machining condition, the determining unit determines whether the machining object corresponds to the machining condition which is read from the machining program or not by using a reflected light intensity at the test position, and causes a determination result output unit to output an abnormal determination result in response to determining that the machining object does not correspond to the machining condition, and the first control unit starts laser machining to the machining object by using the machining program when it is determined that the machining object corresponds to the machining condition.

8. The laser machining control device according to claim 7, wherein the determining unit determines whether the machining object corresponds to the machining condition or not on a basis of a reflected light intensity detected when piercing that is a boring operation to the machining object is performed.

9. The laser machining control device according to claim 7, wherein the first control unit causes the laser oscillator to emit the laser light to an initial machining position set in the machining program under the machining condition, the determining unit determines whether the machining object corresponds to the machining condition or not by using a reflected light intensity when the laser light is emitted to the initial machining position under the machining condition, and the first control unit continues laser machining to the machining object by using the machining program after it is determined that the machining object corresponds to the machining condition.

* * * * *